Sept. 21, 1971  KICHISABURO NAGAHARA  3,606,780
METHOD FOR MANUFACTURING HELICAL PIPE FOR HEAT EXCHANGERS
Filed Nov. 18, 1968  4 Sheets-Sheet 1
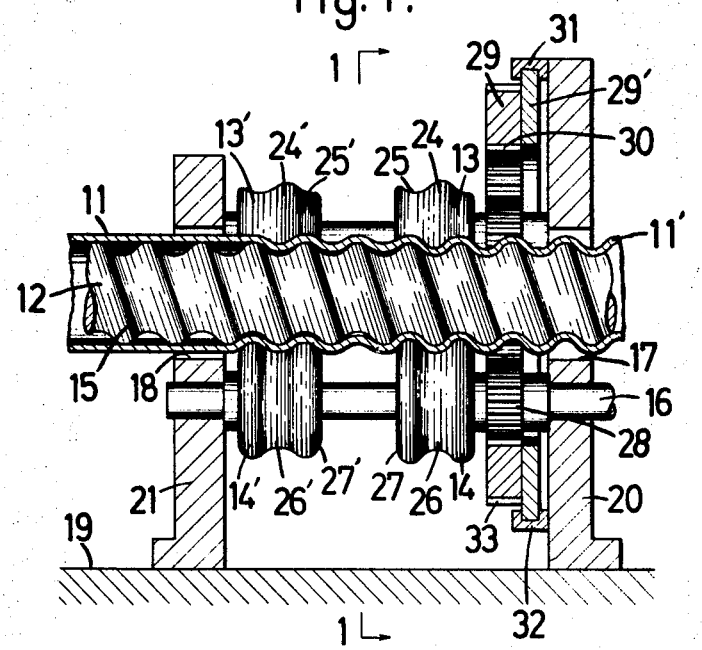
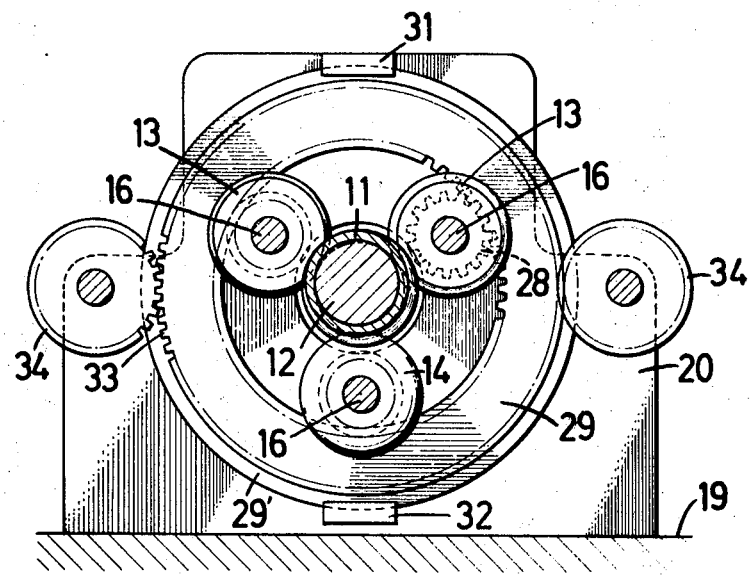
KICHISABURO NAGAHARA, INVENTOR
BY *Wenderoth, Lind & Ponack*
ATTORNEYS Sept. 21, 1971  KICHISABURO NAGAHARA  3,606,780
METHOD FOR MANUFACTURING HELICAL PIPE FOR HEAT EXCHANGERS
Filed Nov. 18, 1968  4 Sheets-Sheet 3

KICHISABURO NAGAHARA,
INVENTOR

BY Wenderoth, Lind & Ponack
ATTORNEYS

Sept. 21, 1971  KICHISABURO NAGAHARA  3,606,780
METHOD FOR MANUFACTURING HELICAL PIPE FOR HEAT EXCHANGERS
Filed Nov. 18, 1968  4 Sheets-Sheet 4

KICHISABURO NAGAHARA, INVENTOR

BY Wenderoth, Lind & Ponack

ATTORNEYS

United States Patent Office 3,606,780
Patented Sept. 21, 1971

3,606,780
METHOD FOR MANUFACTURING HELICAL
PIPE FOR HEAT EXCHANGERS
Kichisaburo Nagahara, 28 Yamamoto-cho Kita, 1-chome,
Yao, Japan
Filed Nov. 18, 1968, Ser. No. 776,366
Claims priority, application Japan, Nov. 28, 1967,
42/76,626; June 28, 1968, 43/45,500
Int. Cl. B21d 13/04
U.S. Cl. 72—77                                         2 Claims

ABSTRACT OF THE DISCLOSURE

A method for forming helical corrugated pipe. A cylindrical pipe is moved along a line corresponding to the axis thereof over a metal core having a helical groove therein, and forming rollers are revolved around the pipe forming it against the core. The pipe can be revolved during the time it is fed along the core.

---

The present invention is concerned with method for manufacturing a helical pipe used in a heat exchanger.

The conventional pipe for the heat exchanger is provided with fins around its outer periphery, and it is very troublesome to make up and to set the fins.

An object of this invention is to provide a method for manufacturing efficiently a helical pipe by corrugating a pipe from its inside and outside.

The above-mentioned object is accomplished as illustrated in detail by the following explanation and accompanying drawings.

FIG. 1 is a longitudinally sectional side view showing the first embodiment of the manufacturing apparatus of the helical pipe according to this invention.

FIG. 2 is a longitudinal side view taken along line 1—1 in FIG. 1.

Figure 3:
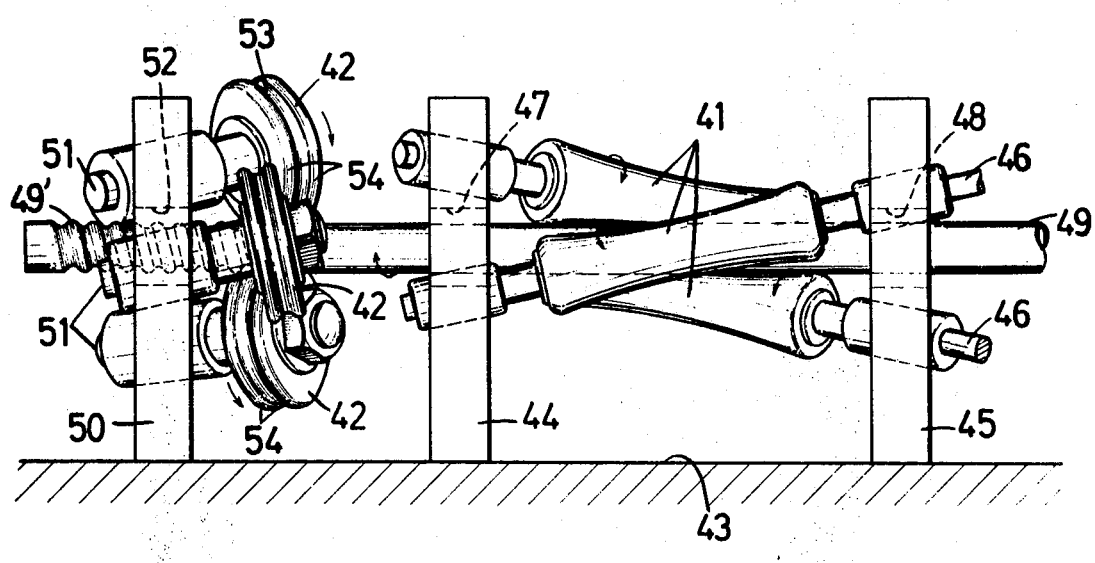
FIG. 3 is a side view showing the second embodiment of the manufacturing apparatus of the helical pipe according to this invention.
Figure 4:
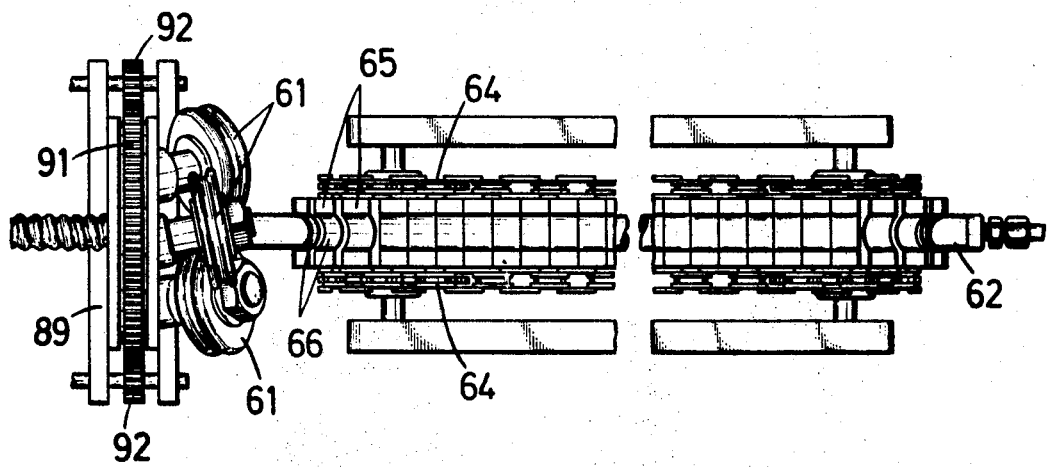
FIG. 4 is a plan view showing the third embodiment of the apparatus for manufacturing the helical pipe according to this invention.
Figure 5:
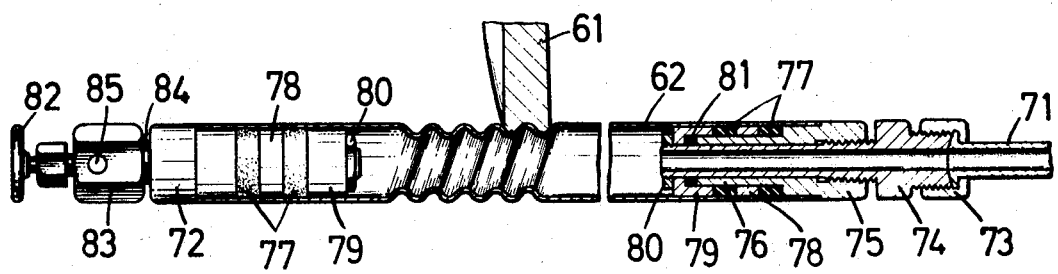
FIG. 5 is an enlarged and longitudinally sectional view of the same.
Figure 6:
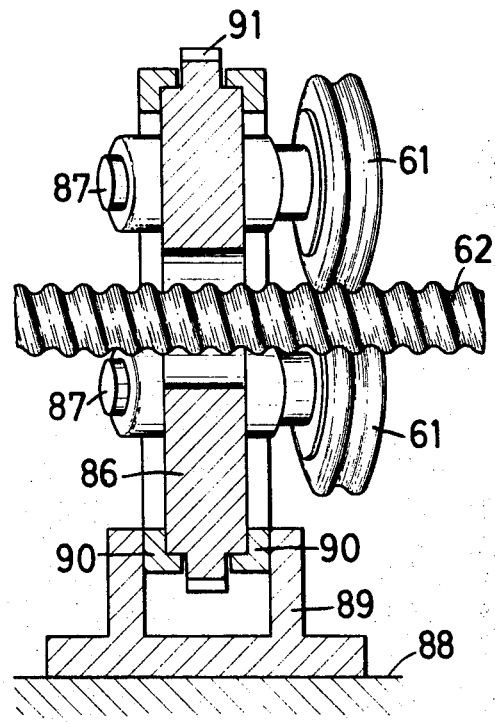
FIG. 6 is an enlarged and longitudinally sectional view of the forming part for the same purpose.

Referring now more particularly to the drawings and especially to FIGS. 1 and 2 thereof, 11 is a metallic material pipe for manufacturing a helical pipe, 12 being a core metal fitted into the material pipe 1, and 13, 13', 14 and 14' are forming rollers for forming the outside of the material pipe 11 under pressure.

Said core metal 12 is, around its outside, provided with helical ridges 15, and grooves formed between the ridges 15 are smoothly joined with an arc therebetween, and the external diameter of the ridges 15 is somewhat less than the internal diameter of the material pipe 11.

The rollers 13, 13', 14, 14' are fixedly mounted to the front and the rear parts of three roller shafts 16, respectively. The front and rear ends of said roller shaft 16 are rotatably mounted to front and rear supporting frames 20, 21 set up on a base 19. To said supporting frames 20, 21 are bored in their coaxial position circular holes 17, 18, through which the material pipe 11 and the core metal 12 can be passed, and said each shaft 16 is mounted in equidistance from the center of the hole 17 and at regular intervals therearound.

The rollers 13, 13' are fixed to the front and the rear parts of the two upper roller shafts 16. At the outside of said each rollers 13, 13' are formed ridges 24, 24' having an arced section, and at both sides thereof are formed grooves 25, 25' having an arced section.

The rollers 14, 14' are fixed to the front and the rear parts of the lower roller shaft 16. At the outside of said each roller 14, 14' are formed grooves 26, 26' having an arced section, and at both sides thereof are formed ridges 27, 27' having an arced section. The ridges 24, 24', 27, 27' of said individual rollers 13, 13', 14, 14' are adaptable to be fitted into grooves formed between the helical ridges 15 of the core metal 12, the helical ridges 15 of the core metal 12 being fitted into the grooves 25, 25', 26, 26' of the rollers 13, 13', 14, 14'. The front rollers 13, 14 have a larger diameter than the rear rollers 13', 14', and the space clearance formed between the front rollers 13, 14 and the core metal 12 is smaller than that between the rear rollers 13', 14' and the core metal 12.

Further, to the front part of each roller shaft 16 is fixed a small gear 28 having the same diameter. The small gear 28 is meshed with the internal teeth formed at the inside of a large gear wheel 29 set to be concentric with the holes 17, 18.

A large sized induction wheel 29' fixed to be concentric with said gear wheel 29 to its front part is supported along its outer periphery to be rotatable but immovable in all other directions by means of supporting pieces 31, 32 fixed at the upper and the lower parts of the rear face of said supporting frame 20. External teeth 33 formed at the outside of the gear wheel 29 are engaged with a pair, the right and the left, of driving gears 34 pivoted to the supporting frame 20, and said driving gears 34 are driven by a suitable driving mechanism.

In the abovementioned apparatus, the material pipe 11, in which the core material 12 was inserted, is inserted through the hole 18 from the rear part of the apparatus, that is, from the left side in FIG. 1 into the space between the rear forming rollers 13', 14'. The pipe 11 is thus meshed between the rollers 13', 14' and the core metal 12. By means of the driving gear 34 the gear wheel 29 is rotated. Then, its rotary direction is clockwise as viewed from the right in FIG. 1 when the core metal 12 is formed in right-handed helical.

The core metal 12 and the material pipe 11 are supported by such suitable device that it can be axially moved and freely rotated. When it is operated as mentioned above, the individual rollers 13, 13' 14, 14' are rotated around the outside of the material pipe 11 while pushing the material pipe 11 under pressure and forming it into a helical pipe shape which corresponds to the helical ridges 15 of the outside of the core metal 12. Thus, the material pipe 11 proceeds with revolving motion as if it is screwed into the internal space between the rollers 13, 13' 14, 14' and comes out in the form of helical pipe 11'.

As the clearance space between the rear rollers 13', 14' and the core metal 11 is large in the above-mentioned case, the amount of corrugation of the pipe 11 is less as shown clearly in FIG. 1, and this corrugation can be easily achieved. While, as the space clearance between the rollers 13, 14 and the core metal 12 is small, the pipe 11 corrugated previously by means of the rollers 13', 14' is further sufficiently corrugated between the rollers 13, 14 and the core metal 12 and changed into a complete helical pipe (11') and fed out forwards, that is, to the right side in FIG. 1 together with the core metal 12. After the material pipe 11 having a definite length was formed into helical pipe as mentioned above, and was removed from the apparatus, the helical pipe (11') thus made is turned and removed from the core metal 12.

FIG. 3 shows a method forming the helical pipe without the core metal. In this drawing 41 are three feeding rollers and 42 are three forming rollers.

The feeding rollers 41 are fixed to three shafts 46 mounted to be rotatable between the front and the rear supporting frames 44, 45 set on a base 43. To said supporting frames 44, 45 are coaxially formed holes 47, 48 through which the material pipe is freely passed, and the shafts 46 are disposed at an equidistance around said holes 47, 48. The directions of their axial lines are inclined to the same direction by a given angle against the axial line of the holes 47, 48. Namely, the center of each shaft 46 is set to be faced to the direction making a right angle with the helix angle of the helical corrugations of the helical pipe to be formed. Each roller 41 has an external shape of a concaved face at its center as shown the drawing and is formed in such that the outer periphery of the roller 41 lies along the outer periphery of the pipe 49 passing between the rollers 41. Each shaft 46 end of said each roller 41 is connected to a suitable driving shaft through a universal joint and is thus rotated at the same speed and along the same direction.

Each forming roller 42 is mounted to be rotatable to three shafts 51 fixed to a supporting frame 50 set on the base 43, respectively. Through the supporting frame 50 is also bored to be concentric with said holes 47, 48 a hole 52 in which the material pipe 49 is passed, and the shafts 51 are set to be at an equidistance to the center of this hole 52 and to be at regular intervals therearound. Each of these shafts 51 is also inclined to the axial line of the holes 47, 48, 52 similarly to said shafts 46, and their inclining angle and directions are similar to the shafts 46. The inclining direction of the outer periphery of the roller 42 is, therefore, similar to a helix angle of the helical pipe to be formed.

The above-mentioned apparatus is operated such that the rollers 41 are rotated while being in pressure contact with the outer peripheral face of the pipe 49 and advances the pipe 49 leftwards in the drawing by revolving in the direction reverse to the rollers 41 when a metallic material pipe 49 having such an external diameter that it is just fitted between the rollers 41 and its outer periphery is in pressure contact with the outer peripheries of the rollers 41 is fed between the rollers 41 from the right side of the drawing and each roller 41 is driven at the same speed along each arrow, respectively.

Around the outer periphery of said forming rollers 42 are formed arced grooves 53 and arced ridges 54 at both sides of said grooves over the whole periphery thereof. Ridges 54 are formed to be intruded around the outer periphery of the material pipe 49, when the material pipe 49 is intruded between the rollers 42 with revolving as set forth above. By the ridges 54 of the rollers 42 are formed around the outer periphery of the pipe 49 helical grooves, and at the same time between said grooves are formed helical ridges, so that the pipe 49 having passed through the rollers 42 is changed into the helical pipe 49' and is pushed out from the rollers 42.

In the embodiment mentioned above, each shaft 46 of each feeding roller 41 and each shaft 51 of each forming roller 42 are preferably movable toward the direction of the material pipe 49, and each roller 41 and each roller 42 are preferably pushed under a suitable pressure through action of oil pressure or a cam mechanism. In the material pipe 49 may be inserted the core metal as shown in the example of FIG. 1.

The embodiment in FIGS. 4 to 7 shows an apparatus for manufacturing a helical pipe by pressing a material pipe 62 under pressure while giving a sun-and-planet motion to three forming rollers 61. The forming rollers 61 of this apparatus are mounted to be rotatable to three shafts 87 fixed to a rotary wheel 86. Said shafts 87 are disposed to be at an equidistance to the center of the rotary wheel 86 and to be at regular intervals therearound. Then, it is similar to the case of the forming roller 42 in the embodiment of FIG. 3 that each shaft 87 is inclined to the axial line of the rotary wheel 86 by a given angle.

Both sides of said rotary wheel 86 are supported to be rotatable by means of a guide wheel 90 fixed to supporting frames 89 on a base 88. Around the outer periphery of said rotary wheel 86 is also formed a gear 91 integrated with said wheel, and with said gear 91 are meshed a pair of driving gears 92 mounted to be rotatable to said supporting frames 89. Thus, the rotary wheel 86 is rotated at a given speed by said driving gears 92.

Figure 7:
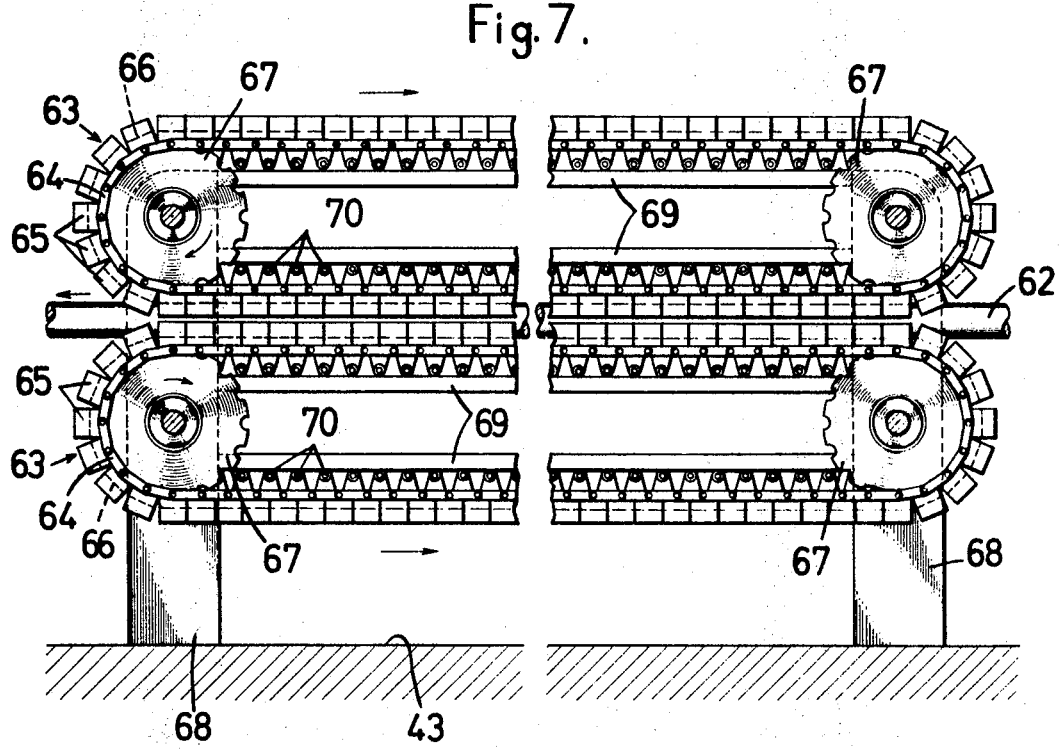
FIG. 7 is a side view of the feeding apparatus for the same purpose.

The feeding apparatus in this embodiment consists of a pair of the upper and the lower Caterpillars 63 as shown in FIG. 7. Said each Caterpillar is composed of a pair of the right and the left endless chains 64 and plurality of push members 65 set at regular intervals on said chains 64. On the surfaces of said push members 65 are formed arced concaves 66 adapted to be fitted around the outside of the material pipe 62.

The front and the rear return portions of said chain 64 are engaged with sprockets 67, which are pivoted to the supporting frames 68 set on the base 43. To the supporting frame are fixed guide rails 69 located inside of the chain 64, and small rollers 70 set on the inside of the chain 64 are in contact with and along the guide rails 69 to keep the Caterpillars 63 horizontal and at the same time to keep the interval between the opposite faces of the upper and the lower Caterpillars 63 completely uniform. Said sprockets 67 are connectively driven by means of a suitable driving mechanism to revolve the upper and the lower Caterpillars 63 along the reverse direction, and the material pipe 62 put between the push members 65 of the Caterpillars 63 is set to be fed toward the forming rollers 61.

To one end of the material pipe 62 is connected a pipe 71 for supplying compressed air, while its other end is closed with a closed member 72.

Said pipe 71 is connected to a connecting pipe 74 by means of a cap nut 73, and the connecting pipe 74 is screwed into a fixed pipe 75 fitted into the pipe 62 end. Inside of said fixed pipe 75 is formed as one body a small sized pipe 76 for supporting packings, and into the clearance between said supporting pipe 76 and the pipe 62 are fitted annular packings 77 and a metallic ring 78. Then, the metallic ring 78 can be freely moved to the pipes 76, 62, and the packings 77 can be easily fitted into between the pipes 76, 62 when in free state. In this case, two packings 77 are disposed at both sides of the metallic ring 78.

The inner end of said connecting pipe 74 is protruded beyond the inner end of the supporting pipe 76, and around the projecting part is fitted a packing push ring 79, the peripheral edge of which is slidably fitted into between the pipes 76, 62 to hold the packings 77, and around the male screw of the connecting pipe 74 end protruded beyond said push ring 79 is screwed a binding nut 80 to hold the push ring 79. Therefore, by revolving the fixed pipe 75 against the connecting pipe 74 and by moving the connecting pipe 74 outwards against the fixed pipe 75 by action of both engaging portion, the packings 77 are compressed by means of the shoulder of the fixed pipe 75, the push ring 79 and the metallic ring 78, and their outer and inner peripheries are expanded and come in close contact with the pipes 76, 62 insure air-tightness, and at the same time they fix the fixed pipe 75 and the like to the pipe 62. In order to insure air-tightness between the pipes 76, 74, a packing 81 between the pipe 76 and the push ring 79 is provided. The closed member 72 is also nearly similar to said fixed member 75 and contains the packings 77, the metallic ring 78, the push ring 79, the binding nut 80 and the like. Then, into the close member 72 is screwed a tubular portion 84 of a valve 83 operated by a handle 82, and this tubular portion 84 is protruded into the pipe 62 to screw the nut 80. Then, to the valve 83 is bored a discharge hole 85 to communicate with the open air when the valve 83 is opened with the handle 82.

In the apparatus mentioned above, by keeping the inside of the pipe 62 at a desired pressure by supplying the compressed air under pressure from the supplying pipe 71 connected to the material pipe 62, the material pipe 62 is held between the upper and the lower Caterpillars 63 and is fed between the forming rollers 61. The forming rollers 61 revolve on their axes while revolving round the pipe 62 together with the gear 91 and the rotary wheel 86 driven by means of the driving gear 92 so as to press the outer periphery of the material pipe 62 under pressure. Thus, the rollers 61 form helical corrugations around the outer periphery of the material pipe 62 and helical pipes are manufactured. In this manufacturing process, the feeding speed of the material pipe 62 by means of the Caterpillars 63 is suitably adjusted such that a helix angle of the corrugations formed with the rollers 61 is coincided with the inclining angle of the rollers 61.

Example set forth above has such sun-and-planet motion that the rollers 61 revolve idly while revolving on their axes at a given position. Such sun-and-planet motion can be carried out by only driving the rotary wheel 86, so that the driving mechanism is simple, and since inside of the material pipe 62 is contained compressed air, in forming under pressure with the rollers 61 the compressed air pressure in the material pipe 62 supports the internal face of the material pipe 62. Therefore, even if the core metal is not inserted into the material pipe 62, a helical pipe having a perfect shape is obtained. In this case, instead of entering the compressed air, water or other liquid may be used. Such method that the fluid is entered into the material pipe can be also applied to the examples shown in FIGS. 1 to 3.

Figure 8:
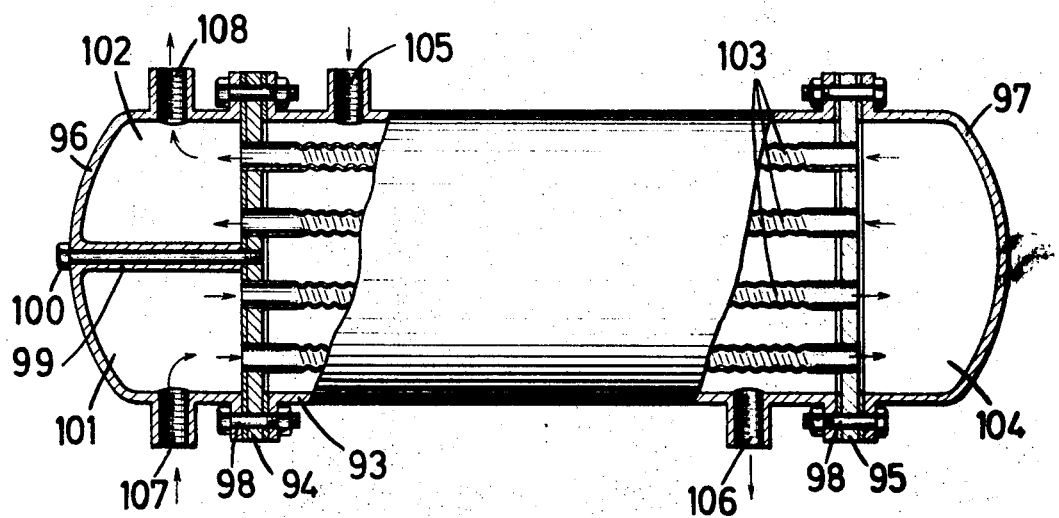
FIG. 8 is a longitudinal side view of part of the heat exchanger showing application of the helical pipe manufactured by the present invention.

The helical pipe manufactured by the above examples displays high efficiency when used as a heat exchanger, and such application will be shown as in FIG. 8. In FIG. 8, 93 is a drum body, 94 and 95 being end plates set to both ends of said drum body, 96 and 97 being cap-shaped covers fixed to the outsides of said end plates 94, 95, and these are fixed to the drum body 93 with bolts 98.

At the center of the inside of the cover 96 is located a partition wall 99, which is fixed to the end plate 94 with a bolt 100, and thereby the inner part of the cover 96 is divided into a chamber 101 and a chamber 102 by the partition wall 99. Between the end plates 94, 95 are fixed both ends of many helical pipes 103 manufactured according to this invention, and through said helical pipes 103 the chamber 101 and chamber 102 in the cover 96 communicate with the chamber 104 in the cover 97. Then, to the drum body 93 are set an inlet 105 and an outlet 106 of fluid, and to the cover 96 are also set an inlet 107 of fluid communicating with the chamber 101 and an outlet 108 of fluid communicating with the chamber 102.

In the construction set forth above, one of the fluids e.g. steam enters into the drum body 93 from the inlet 105 and flows out of the outlet 106, while the other of the fluids, e.g. water, enters into the chamber 101 from the inlet 107 and passes through the helical pipe 103 communicating with said chamber and enters into the chamber 104 and then passes through the helical pipe 103 communicating with the chamber 102 and flows out of the outlet 108 through the chamber 102.

During the process mentioned above, heat exchange takes place between the fluids which come in contact with the outer and the inner faces of the helical pipe 103. In this case the helical pipe is made such that its outer and inner surfaces have helical corrugations, so that the contact area to the outer and the inner fluids is so great that heat exchange efficiency is high, and then the flexibility of the helical pipe 103 is so great that joints between the helical pipes 103 and the end plates 94, 95 are not troublesome even in expansion and contraction of the drum body 93 due to temperature change. Thus, the present heat exchange assembly has such effects and features as mentioned above.

What I claim is:

1. A method for manufacturing helical corrugated pipe comprising inserting a corrugated core metal having helical ridges and grooves on the outer periphery thereof within a smooth metal tube; positioning the thus assembled core metal and metal tube adjacent a first set of forming rollers having helical ridges and grooves around the outer peripheries thereof adapted to oppose said grooves and ridges, respectively, of said core metal; rotating the rollers of said first set of forming rollers such that said core metal and metal tube are rotated and drawn therethrough, thereby partially deforming said metal tube between said core metal and said first set of forming rollers; and passing said partially deformed metal tube to a second set of forming rollers having helical ridges and grooves around the outer peripheries thereof adapted to oppose said grooves and ridges, respectively, of said core metal; rotating the rollers of said second set of forming rollers closer to said core metal than said first set of forming rollers such that said core metal and partially deformed metal tube are further rotated and drawn therethrough, thereby further deforming said metal tube between said core metal and said second set of forming rollers.

2. A method as claimed in claim 1, wherein said first and second sets of forming rollers each comprise three rollers equally spaced around the axis of said metal tube, said method further comprising rotating each of said rollers at the same speed.

References Cited
UNITED STATES PATENTS

| | | | |
|---|---|---|---|
| 390,899 | 10/1888 | Pratt et al. | 72—78 |
| 727,830 | 5/1903 | Park | 72—57 |
| 798,448 | 8/1905 | Pogany et al. | 72—100 |
| 812,435 | 2/1906 | Monteagle | 72—100 |
| 1,983,468 | 12/1934 | Knab | 72—96 |
| 2,037,378 | 4/1936 | Guarnaschelli | 72—115 |
| 3,014,519 | 12/1961 | Wright | 72—78 |
| 3,387,477 | 6/1968 | Shupper | 72—78 |
| 3,407,638 | 10/1968 | Greis et al. | 72—370 |

FOREIGN PATENTS

| | | |
|---|---|---|
| 1,120 | 1/1887 | Great Britain. |

RICHARD J. HERBST, Primary Examiner

U.S. Cl. X.R.

72—370